(12) United States Patent
Vanderwees

(10) Patent No.: US 8,029,248 B2
(45) Date of Patent: Oct. 4, 2011

(54) INTEGRATED COOLANT PUMPING MODULE

(75) Inventor: Doug Vanderwees, Mississauga (CA)

(73) Assignee: Dana Canada Corporation, Oakville (CA)

( * ) Notice: Subject to any disclaimer, the term of this patent is extended or adjusted under 35 U.S.C. 154(b) by 711 days.

(21) Appl. No.: 12/133,460

(22) Filed: Jun. 5, 2008

(65) Prior Publication Data

US 2009/0304531 A1 Dec. 10, 2009

(51) Int. Cl.
*F04B 49/00* (2006.01)
*F04B 35/04* (2006.01)

(52) U.S. Cl. .................. 417/307; 417/423.1; 417/423.14

(58) Field of Classification Search .................. 417/302, 417/307, 423.1, 423.14; 123/41.1, 41.44; 137/565.11
See application file for complete search history.

(56) References Cited

U.S. PATENT DOCUMENTS

| | | | |
|---|---|---|---|
| 4,893,749 A | 1/1990 | Schichl | |
| 5,529,026 A * | 6/1996 | Kurr et al. | 123/41.1 |
| 6,257,177 B1 * | 7/2001 | Lehmann | 123/41.44 |
| 6,420,060 B1 | 7/2002 | Yamamoto et al. | |
| 6,682,844 B2 | 1/2004 | Genc | |
| 6,688,333 B2 * | 2/2004 | McLane et al. | 137/625.11 |
| 6,729,364 B2 | 5/2004 | Few et al. | |
| 6,886,606 B2 | 5/2005 | Few et al. | |
| 6,964,820 B2 | 11/2005 | Shimonosono et al. | |
| 6,979,509 B2 | 12/2005 | Breault | |
| 2002/0189555 A1 * | 12/2002 | Murakami et al. | 123/41.1 |
| 2004/0142227 A1 | 7/2004 | Sugai et al. | |
| 2004/0146769 A1 | 7/2004 | Birschbach | |
| 2005/0069738 A1 | 3/2005 | Tajima et al. | |
| 2005/0106040 A1 * | 5/2005 | Repple et al. | 417/313 |
| 2006/0210859 A1 | 9/2006 | Choi et al. | |
| 2006/0216166 A1 * | 9/2006 | Pawellek | 417/371 |
| 2007/0042247 A1 | 2/2007 | Baird et al. | |
| 2007/0072016 A1 | 3/2007 | St-Pierre et al. | |
| 2007/0082242 A1 | 4/2007 | Meltser et al. | |
| 2007/0087241 A1 | 4/2007 | Mulvenna et al. | |

* cited by examiner

*Primary Examiner* — Devon C Kramer
*Assistant Examiner* — Peter J Bertheaud
(74) *Attorney, Agent, or Firm* — Ridout & Maybee LLP

(57) ABSTRACT

An integrated pumping module for use in a thermal management system, for example for a fuel cell. The integrated pumping module includes a diverting or mixing valve closely coupled to a pump element, such as the volute chamber of a centrifugal pump. The valve chamber and the pump chamber are closely and directly coupled through a connecting passage so as to minimize pressure drop as a liquid coolant passes through the connecting passage from the valve chamber to the pump chamber. A bypass inlet and outlet opening are provided in the valve chamber to permit all or a portion of the coolant flow to be diverted to a radiator once the coolant reaches a predetermined temperature. The integrated pumping module may also be provided with a filter housing into which a portion of the coolant flow may be diverted.

16 Claims, 8 Drawing Sheets

INTEGRATED COOLANT PUMPING MODULE

FIELD OF THE INVENTION

The invention relates to coolant pumping modules for use in thermal management systems, and in particular coolant pumping modules which comprise an integrated coolant pump and a diverting or mixing valve.

BACKGROUND OF THE INVENTION

Thermal management systems are used in a variety of applications where temperature modulation of heat-generating components is required. One such application is in the thermal management of a fuel cell system, whether stationary or vehicular, which typically contains a number of heat-generating components requiring temperature modulation. Fuel cell systems include one or more heat transfer circuits, each of which may include its own heat exchanger, circulation pump, mixing valve and/or diverting valve.

In order to reduce complexity, cost and space requirements of fuel cell systems, it is desirable to reduce the number of components making up the thermal management system.

SUMMARY OF THE INVENTION

In one aspect, the present invention provides a coolant pumping module for a thermal management system. The coolant pumping module comprises a housing, a valve element and a pump element. The housing defines a first chamber and a second chamber which are integrally formed with one another and which are in fluid communication through a connecting passage. The housing has a coolant inlet port provided in communication with the first chamber and a coolant outlet port provided in communication with the second chamber, and the housing has a bypass inlet port and a bypass outlet port which are in fluid communication with the first chamber. The valve element is provided in the first chamber and is movable between a first position in which the valve element at least partially blocks flow of coolant between the coolant inlet port and the connecting passage, and a second position in which increased fluid flow is permitted between the coolant inlet port and the connecting passage. The pump element is provided in the second chamber for increasing the energy of coolant flowing through the coolant outlet port.

BRIEF DESCRIPTION OF THE DRAWINGS

The invention will now be described, by way of example only, with reference to the accompanying drawings, in which.

DETAILED DESCRIPTION

Figure 1:
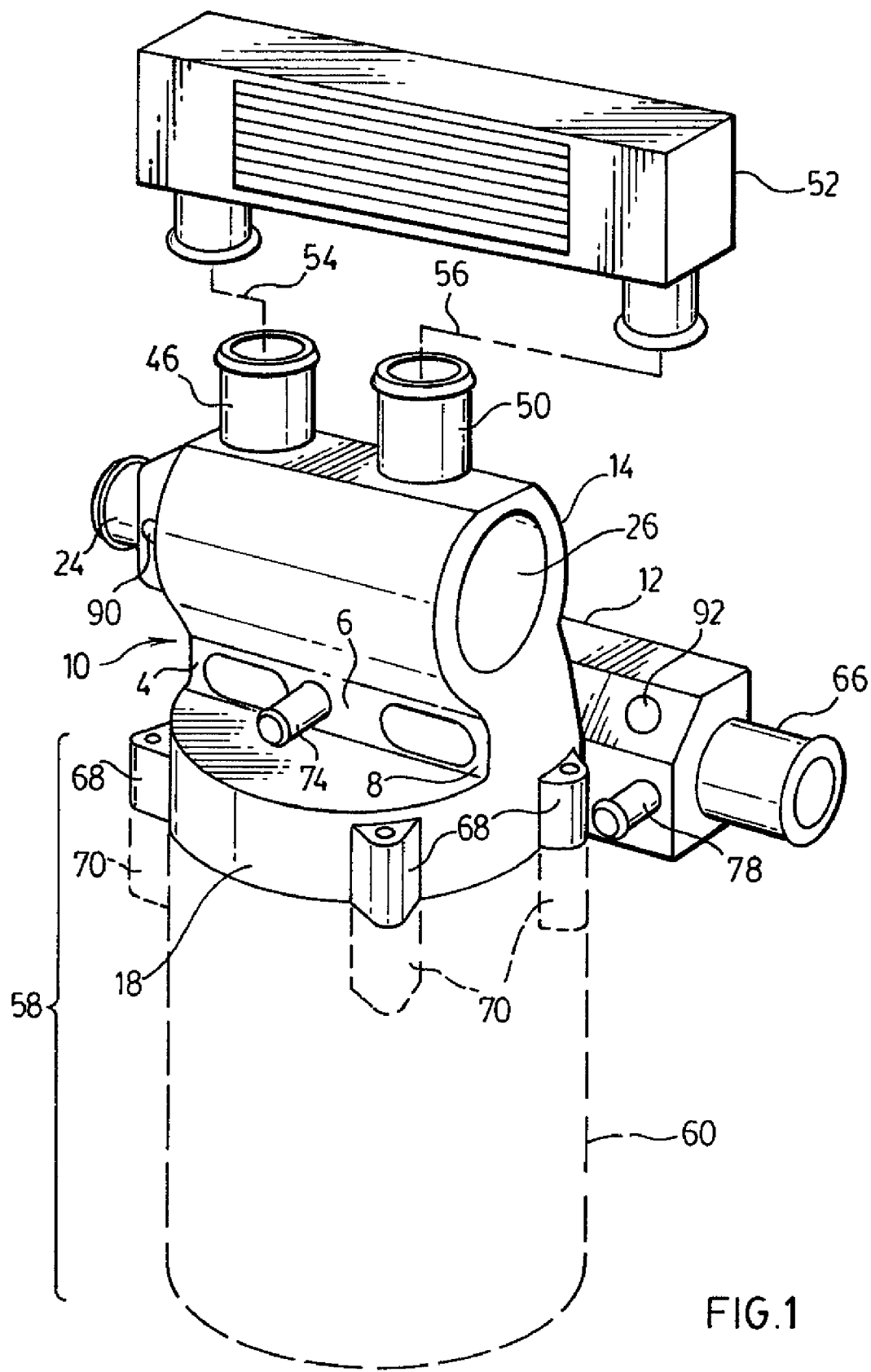
FIG. 1 is a perspective view of a coolant pumping module according to a first embodiment of the invention in combination with a pump housing and an external radiator.

FIGS. 1 to 5 illustrate a coolant pumping module 10 according to a first embodiment of the invention. Coolant pumping module 10 comprises a housing 12 which is comprised of a first portion 14 defining a first chamber 16 and a second portion 18 defining a second chamber 20. The housing 12 is preferably integrally formed from a metallic or non-metallic material. Suitable non-metallic materials include heat-resistant polymeric materials. The first and second portions 14, 18 of housing 12 may be connected by web portions 4, 6 and 8.

The first portion 14 of the housing 12 and the first chamber 16 are shown in the drawings as being generally cylindrically shaped, but this is not necessarily the case. Rather, the first portion 14 of housing 12 and the chamber 16 may be of variable shape, depending on the application and the type of valve used. The generally cylindrical chamber 16 defines a first axis A.

The first portion 14 of housing 12 has a first end provided with a coolant inlet port 22 provided with a coolant inlet fitting 24 for connection to a coolant conduit (not shown). Where the coolant pumping module 10 is used in a fuel cell system (not shown) the coolant inlet port 22 receives coolant, either directly or indirectly, from a fuel cell stack (not shown). In the coolant pumping module 10 according to the first embodiment, the coolant inlet fitting 24 is aligned parallel to axis A and therefore the coolant flows along axis A as it enters the first chamber 16.

Figure 4:
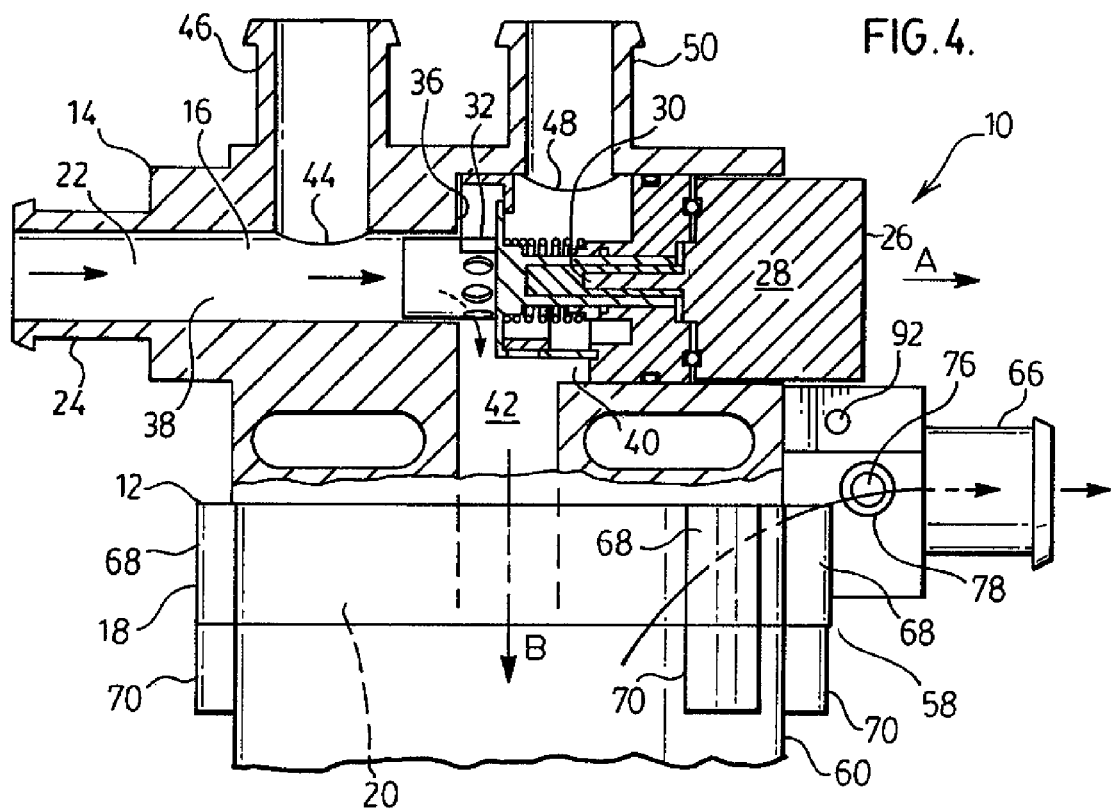
FIG. 4 is a side elevation view, partly in cross-section, showing the coolant pumping module of FIG. 1 in combination with a pump housing, and showing the valve in the open configuration.
Figure 5:
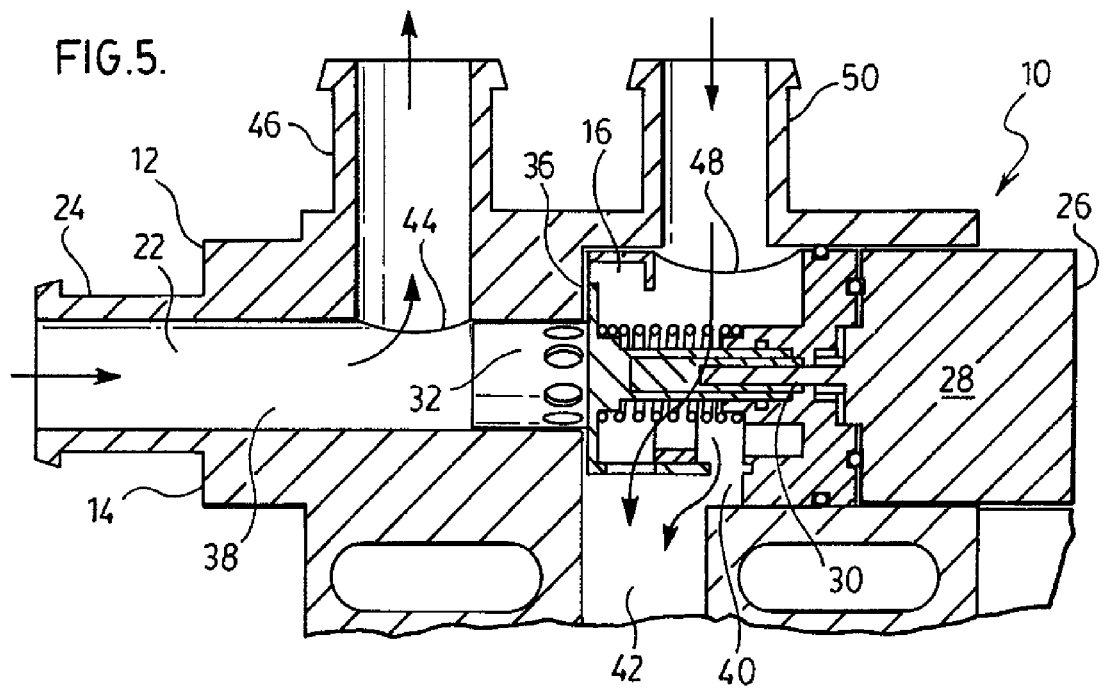
FIG. 5 is a side elevation view, partly in cross-section, showing the coolant pumping module of FIG. 1 with the valve in the closed configuration.

The first portion 14 of housing 12 has a second end, located opposite to the coolant inlet port 22, which receives a valve 26. The valve 26 is schematically shown in FIGS. 4 and 5 as comprising an actuator 28, a valve stem 30 which extends along axis A and is actuated by the actuator 28, and a valve element 32 provided on the valve stem 30, and movable by the valve stem 30 into and out of engagement with a valve seat which may comprise a shoulder 36 formed in the inner wall of the first chamber 16. The valve element 32 may have a hollow plug portion which is closely received inside fluid passage 38 so as to maintain proper alignment of the valve 26. In the coolant pumping module 10, the shoulder 36 separates the interior of the first chamber 16 into two portions, a fluid passage 38 having a first diameter and a valve chamber 40 of a second, greater diameter. Preferred forms of this type of linearly actuated valve are described in U.S. patent application Ser. No. 11/695,985, filed on Apr. 3, 2007, which is incorporated by reference herein in its entirety.

Although the valve 26 may comprise a linearly actuated valve as described above, it may be preferred to use an alternate type of valve structure, for example a flapper valve. Also, it will be appreciated that the actuator 28 may comprise an electronic actuator such as a solenoid. The operation of the solenoid may be controlled by an electrical control unit (not shown) which may preferably receive temperature information from one or more temperature sensors which may be integral to the coolant pumping module 10 or which may be located elsewhere in the thermal management system. Alternatively, the actuator 28 may comprise a thermally sensitive material such as wax which is contained in a barrel and which expands to cause movement of the valve stem 30 and the valve element 32.

The housing 12 further comprises a connecting passage 42 having a first end communicating with the interior of the first chamber 16, and more particularly the valve chamber 40 thereof, and a second end communicating with the interior of the second chamber 20. The connecting passage 42 is a straight, cylindrical passage which is of suitable diameter and of minimal length so as to minimize pressure drop of coolant passing between the first and second chambers 16, 20. The connecting passage 42 defines a second axis B, which in the preferred coolant pumping module 10 is perpendicular to axis A. Furthermore, the first end of connecting passage 42 is spaced apart from the coolant inlet port 22 along axis A. In coolant pumping module 10, the connecting passage extends through the middle web 6 connecting the first and second portions 14, 18 of housing 12.

The first chamber 16 is also provided with a bypass outlet port 44 provided with a cylindrical outlet fitting 46, and a bypass inlet port 48 provided with a cylindrical inlet fitting 50. The bypass outlet and inlet ports 44, 48 are in flow communication with an external heat exchanger such as a radiator 52. Dotted lines 54 and 56 in FIG. 1 represent conduits which are connected to the radiator fittings and the bypass fittings 46, 50 of the first chamber 16. The fittings 46, 48, conduits 54 and 56 and radiator 52 together make up a bypass circuit.

The bypass outlet port 44 is in flow communication with the fluid passage 38 of first chamber 16 and is located along axis A between the coolant inlet port 22 and the shoulder 36 and valve element 32. Thus, the valve 26 does not block flow of coolant between the coolant inlet port 22 and the bypass outlet port 44, regardless of the configuration of the valve 26. However, with the valve in the fully open position shown in FIG. 4 the valve element 32 completely blocks the flow of coolant between the bypass inlet port 48 and the connecting passage 42, and therefore there is no flow of coolant through the bypass circuit when the valve is fully open.

With the valve 26 in the fully open position as shown in FIG. 4 all of the coolant flows from the inlet port 22, through fluid passage 38 and valve chamber 40 of the first chamber 16. The coolant enters the hollow valve plug 32, flows through the apertures thereof and changes direction to flow through the connecting passage 42 and into the second chamber 20. The valve 26 may be fully or partially open during initial start-up of the fuel cell system, before it warms up to normal operating temperature. With the valve 26 partially open some flow will be permitted through the bypass circuit, but most of the coolant will continue to flow through the first chamber 16 into the connecting passage 42 due to increased resistance to flow caused by the radiator, particularly when the coolant is cold and relatively viscous upon initial start-up.

When the valve 26 is actuated, the valve element 32 moves from the fully open configuration of FIG. 4 toward the configuration shown in FIG. 5 in order to partially or completely close the valve 26. In the fully closed configuration shown in FIG. 5, an annular flange of the valve element 32 engages shoulder 36 and direct flow communication between the coolant inlet port 22 and the connecting passage 42, through the fluid passage 38 and the valve chamber 40, is blocked. This results in all the coolant flow being directed through the bypass circuit. The valve element 32 also includes a portion located in first chamber 16 which opens during actuation of the valve to permit direct flow communication between the bypass inlet port 48 and the connecting passage 42, thereby permitting flow through the bypass circuit. The specific operation of valve 26 is more specifically described in above-mentioned U.S. patent application Ser. No. 11/695,985.

It will be appreciated that the valve 26 can be actuated so that the valve element 32 is located at any position intermediate those shown in FIGS. 4 and 5. Thus, the open area of the apertures of valve element 32 can be varied so as to adjust the proportion of coolant fluid flowing through the apertures, and consequently adjust the proportion of coolant flowing through the bypass circuit.

Figure 2:
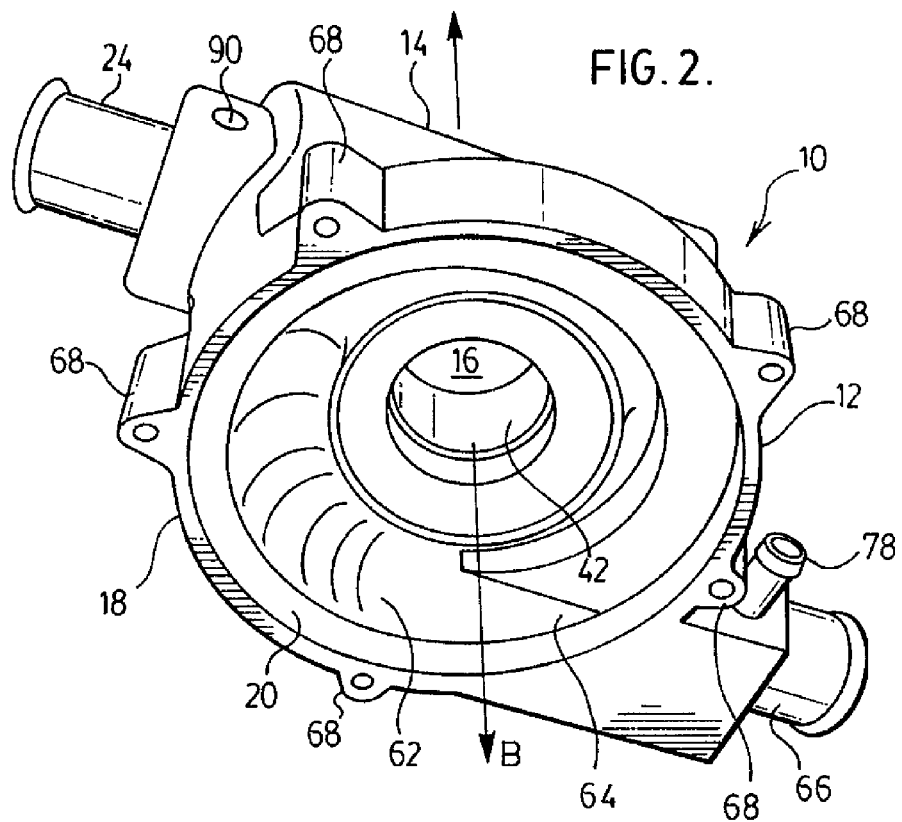
FIG. 2 is a bottom perspective view of the coolant pumping module of FIG. 1, shown in isolation.
Figure 3:
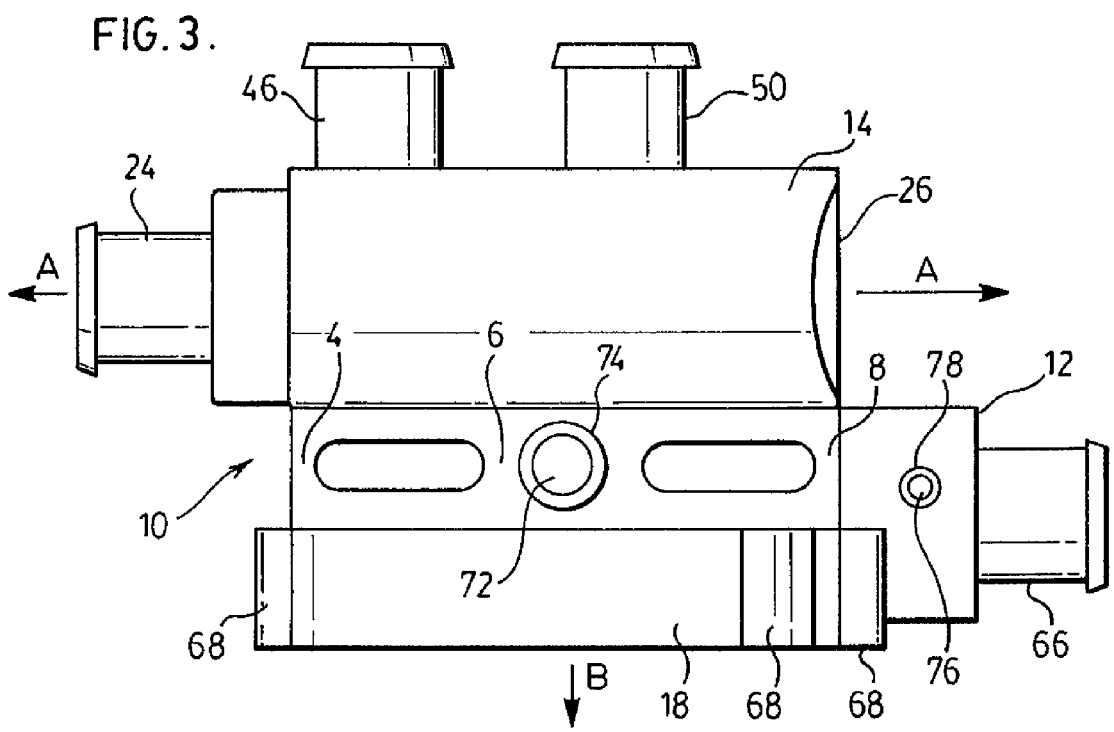
FIG. 3 is a side elevation view of the coolant pumping module of FIG. 1.

The second portion 18 of housing 12 and the second chamber 20 defined thereby are shown in the drawings as being generally cylindrically shaped, but this is not necessarily the case, and depends on the application and the type of pump used for the coolant pumping module. As shown in FIG. 2, the second portion 18 of housing 12 and the second chamber define the top portion of a pump 58. The pump 58 may comprise a centrifugal pump having an impeller (not shown) for accelerating the coolant after it enters the pump 58. The impeller is enclosed in a cylindrical housing 60 which is closed at its bottom end and is open to the second chamber 20 at its upper end. The impeller has an axis of rotation which is coaxial with second axis B. Also enclosed within the housing 60 of pump 58 are the pump motor (not shown) and the motor controller (not shown).

As shown in FIG. 2, the coolant flows along second axis B as it enters the second chamber 20 to be energized by the pump impeller. Acceleration of the coolant by the impeller causes it to flow radially outwardly where it enters an annular volute chamber 62 and then flows out from the coolant pumping module 10 through the coolant outlet port 64. The outlet port 64 extends tangentially from the second portion 18 of housing 12, being provided with a cylindrical coolant outlet fitting 66 through which the coolant is returned to the heat transfer circuit.

The outer surface of the second portion 18 of housing 12 is provided with a plurality of lugs 68, each having a bore extending parallel to second axis B. As shown in FIG. 1, these lugs 68 of the housing 12 align with lugs 70 of the pump housing 60, which are also provided with bores (not shown). These lugs 68, 70 provide a means for fastening the cylindrical housing 60 to the second chamber 20, with fasteners such as screws or bolts (not shown) extending through the bores to hold the pump housing 60 and the second chamber 20 together. It will be appreciated that alternate means may be used for attaching the pump housing 60 to the second chamber 20.

Depending on the specific configuration of the heat transfer circuit in which the coolant pumping module 10 is installed, the coolant pumping module 10 may be connected to a plurality of heat-generating components. For example, the coolant inlet port 22 may receive coolant from the coolant outlet port of a fuel cell stack and the coolant outlet port 64 may be connected to the coolant inlet port of the fuel cell stack. In addition to being connected to the fuel cell stack, the coolant pumping module 10 may also be connected to the inlet and outlet of at least one other component of the fuel cell system, such as another heat exchanger, a filter or a heat-generating component. For this purpose, the coolant pumping module 10 has at least one secondary inlet port 72 provided with a cylindrical inlet fitting 74 and at least one secondary outlet port 76 provided with a cylindrical outlet fitting 78. The secondary inlet and outlet ports 72, 76 are visible in FIG. 3.

In the coolant pumping module 10 the secondary inlet port 72 is provided in the cylindrical side wall of the connecting passage 42 and extends in a direction which is perpendicular to the second axis B. The secondary outlet port 76 is provided in the second portion 18 of housing 12, at the coolant outlet port 64, located between the volute chamber 62 and the coolant outlet fitting 66. The secondary outlet port and fitting 76, 78 extend in a direction which is perpendicular to the flow of coolant through the coolant outlet port 64. The specific locations and orientations of the secondary inlet and outlet ports 72, 76 and the associated fittings 74, 78 shown in the drawings are not essential to the present invention. Rather, it will be appreciated that their locations and orientations can be varied from that shown in the drawings. It is preferred, however, that the secondary outlet port 76 and fitting 78 are located on the high pressure side of the coolant pumping module 10, i.e. at the outlet side of the pump 58, between the pump volute chamber 62 and the outlet port 64. It is also preferred that the secondary inlet port 72 and fitting 74 are located on the low pressure side of the coolant pumping module 10, i.e. upstream of the pump 58 between the coolant inlet port 22 and the pump volute chamber 62.

The secondary inlet and outlet fittings 74, 78 connect the coolant pumping module 10 to another component of the thermal management system such as a second heat-generating component, a filter or a heat exchanger. A portion of the coolant passing through the outlet port 64 is diverted through secondary outlet port 76 and fitting 78 to the other component and returns to the main coolant stream at the secondary inlet port and fitting 72, 74, to enter the connecting passage 42. Where the other component to which coolant pumping module 10 is connected is a heat-generating component, the secondary inlet port and fitting 72, 74 may preferably be located in the first portion 14 of housing 12, adjacent to the coolant inlet port 22, i.e. upstream of the bypass outlet port 44, so that the coolant from the heat-generating component may be cooled by radiator 52, depending on the configuration of the valve 26.

During cold start-up of the fuel cell system it is desirable to heat the coolant circulating in the thermal management system to assist in quickly heating the system to the desired operating temperature. While the coolant can be heated by electric heaters located externally of the coolant pumping module 10, the coolant can be at least partially heated by spinning the pump impeller against a pressure head which may be created by reducing the coolant flow through the pump. Various means can be used for restricting the flow of coolant from the outlet of the pump. For example, the flow can be restricted by providing an orifice bypass line or an electronic valve to limit the coolant flow while the pump is spinning during start-up. The bypass line can be located internally or externally of the housing 14 of the coolant pumping module 10.

Figure 6:
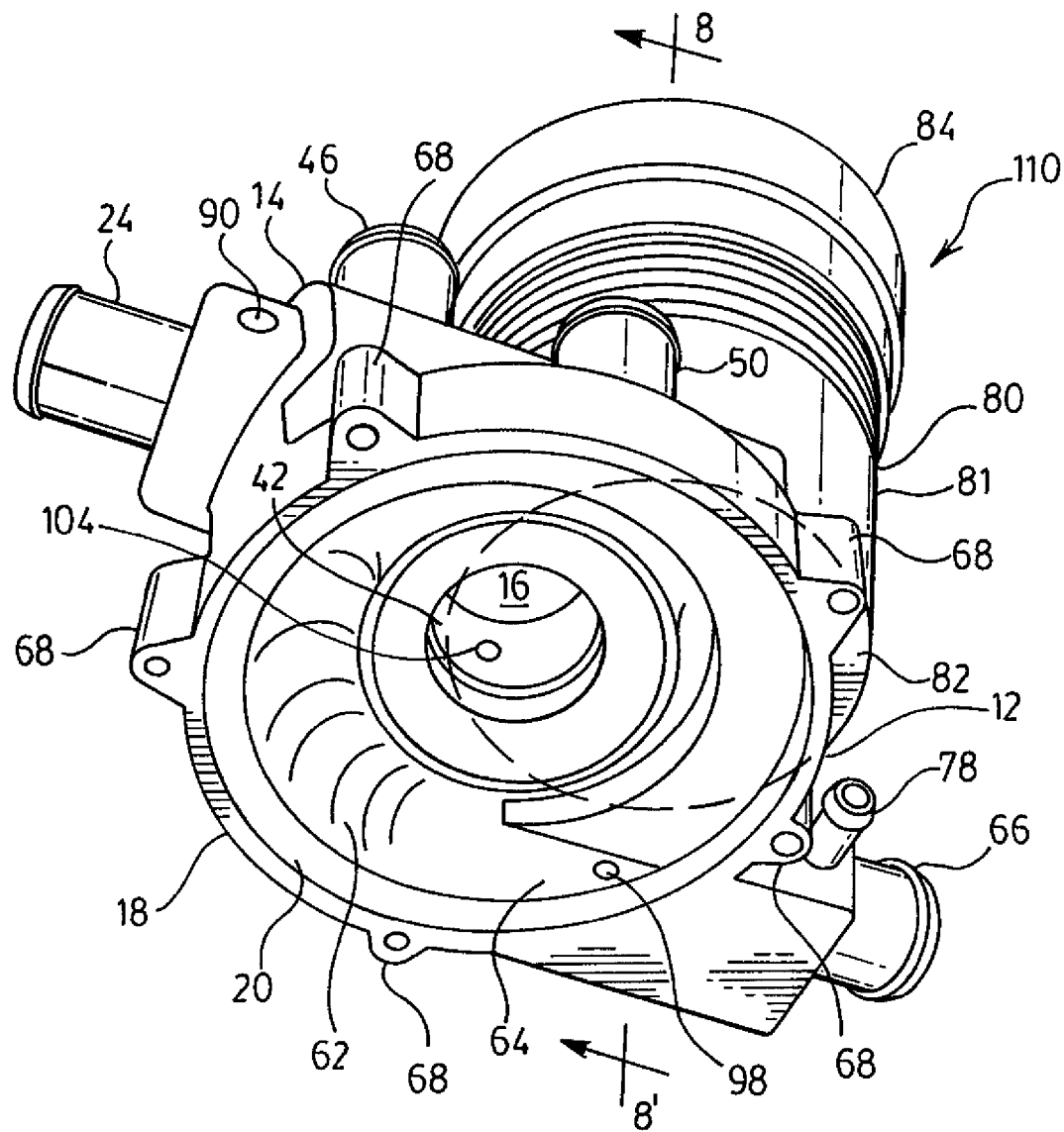
FIG. 6 is a bottom perspective view of a coolant pumping module according to a second embodiment of the invention.
Figure 7:
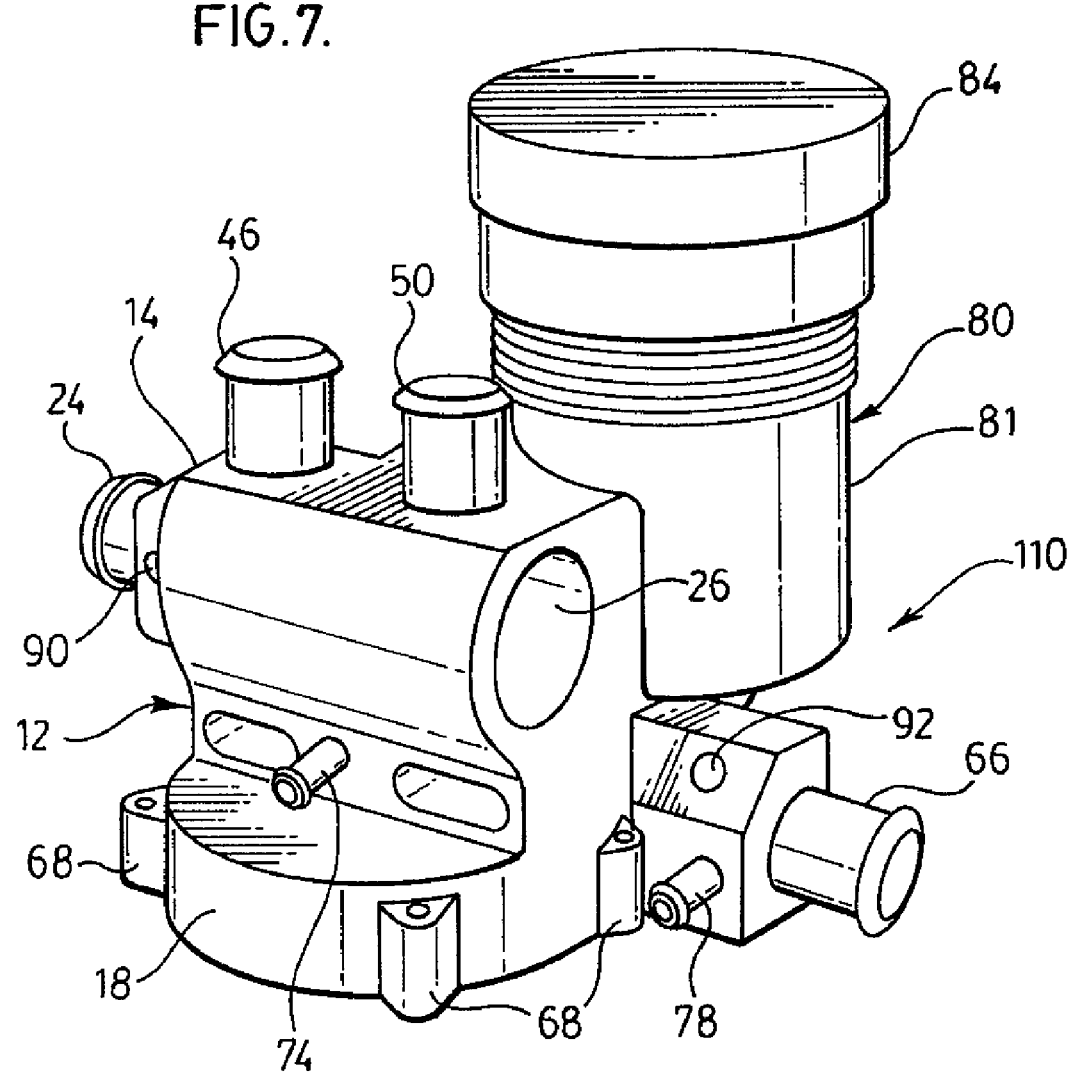
FIG. 7 is a side perspective view of the coolant pumping module of FIG. 6.
Figure 8:
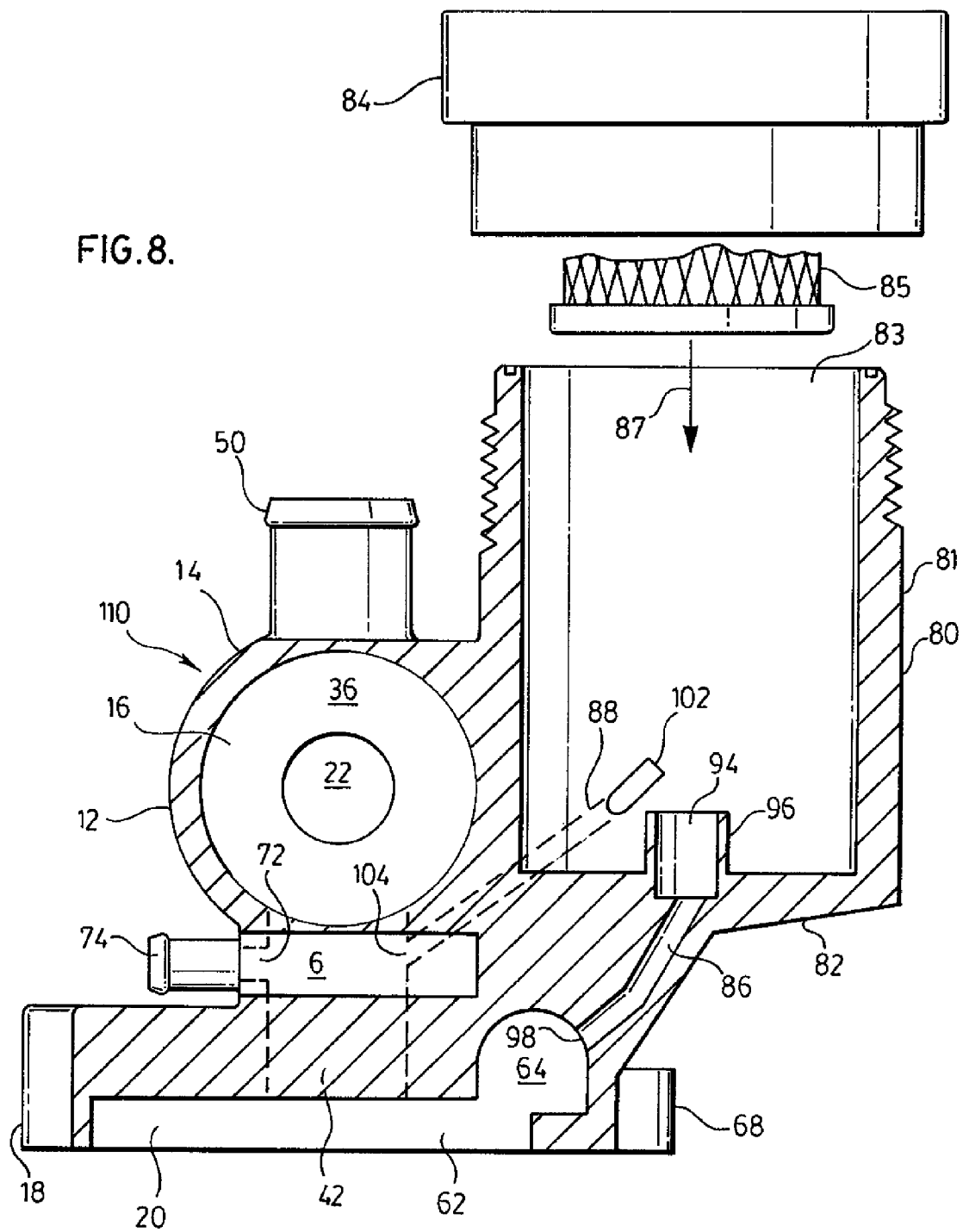
FIG. 8 is a cross-section along line 8-8' of FIG. 6, with the valve 26 omitted.

FIGS. 6 to 8 illustrate a coolant pumping module 110 according to a second embodiment of the invention. Coolant pumping module 110 is similar to coolant pumping module 10 described above, and similar components of coolant pumping module 110 are identified by similar reference numerals. The coolant pumping module 110 differs from coolant pumping module 10 in that it is provided with means for filtering a portion of the coolant flowing through the coolant pumping module 110. For this purpose, the coolant pumping module 110 is provided with a filter having a housing 80 with a cylindrical side wall 81, a closed bottom 82 and an open top 83 (FIG. 8) closed by a removable screw-on cap 84. The filter housing 80 contains a filter element 85 (partially shown in FIG. 8) which is preferably removable and replaceable through the open top 83 of the housing 80, as indicated by arrow 87 in FIG. 8. The filter may preferably comprise a de-ionizing filter and/or a particulate filter.

The side wall 81 and bottom 82 of filter housing 80 are attached to the housing 12 of the coolant pumping module 10, and the filter housing 80 is preferably integrally formed with the housing 12. The filter housing 80 has a longitudinal axis which is parallel to arrow 87. The axis of filter housing 80 is perpendicular to first axis A and parallel to second axis B described above in connection with coolant pumping module 10. It will be appreciated, however, that the specific orientation of the filter housing shown in the drawings is not essential to the invention. Rather, the orientation of filter housing 80 can be varied as necessary to meet the requirements of any specific application while preferably maintaining a compact size. For example, the axis of the filter housing 80 may be parallel to first axis A and perpendicular to second axis B, or the axis of the filter housing may be parallel to both axes A and B.

The filter housing 80 is provided with a filter inlet passage 86 and a filter outlet passage 88, both of which can be seen in FIG. 8. A portion of the coolant flowing through the coolant pumping module 10 enters the filter housing 80 through filter inlet passage 86, which is open at both ends and extends from the high pressure side of the coolant pumping module 10 to a central opening 94 in the bottom 82 of the filter housing 80. The central opening may be surrounded by a side wall 96 which assists in centering the filter element 85 inside housing 80. Preferably, as shown in FIG. 8, the filter inlet passage 86 receives coolant from the high pressure side of the module 10 through an aperture 98 located at the outlet side of the pump 58, between the pump volute chamber 62 and the outlet port 64. The filter inlet passage 86 is preferably enclosed within a rib or web of material 100 which extends between the bottom 82 of filter housing 80 and the housing 12 of the coolant pumping module 10. It will, however, be appreciated that the filter inlet passage 86 may instead be located externally of the filter housing 80 and the housing 12 of the coolant pumping module 10.

Once the coolant enters the interior of filter housing 80 through opening 94 it passes radially outward through the filter element 85 into an annular chamber between the filter element 85 and the side wall 81 of filter housing 80. The filter outlet passage 88 is open at both ends and extends from an opening 102 located in the side wall 81 of filter housing 80 to an aperture 104 located in the low pressure side of the coolant pumping module 10. The filtered coolant located in the annular chamber therefore enters the filter outlet passage 88 through the aperture 102 and flows through the passage 88 to the low pressure side of the coolant pumping module 10. The aperture 104 is preferably located at the inlet side of the pump 58 between the coolant inlet port 22 and the pump volute chamber 62. As shown in the drawings, the aperture 104 may be located in the side wall of the connecting passage 42. The filter outlet passage 88 is preferably enclosed within the material comprising the integrally formed filter housing 80 and the first portion 14 of housing 12. It will, however, be appreciated that the filter outlet passage 86 may instead be located externally of the filter housing 80 and the housing 12 of the coolant pumping module 10.

It will be appreciated that only a portion of the total flow of coolant through the coolant pumping module 10 will be diverted to flow through the filter. The amount of coolant flow through the filter can be adjusted by adjusting the diameters of the filter inlet and outlet passages 86, 88 and/or their associated openings 94, 98, 102, 104. Increasing the flow of coolant through the filter has the effect of increasing the total pressure drop of the coolant pumping module 10, so adjusting the volume of flow through the filter provides a limited means for controlling the total pressure drop across the coolant pumping module 10. The inventors have found that diverting about 5-25 percent of the coolant flow to the filter can provide adequate filtering performance without increasing the pressure drop across the coolant pumping module 10 to an unacceptable level.

Coolant pumping module 10 may also be provided with means for sensing the temperature of the coolant flowing through the module 10. Preferably the temperature is sensed by at least two temperature sensors, with one temperature sensor located at a first point upstream of the coolant bypass circuit and another temperature sensor located at a second point downstream of the bypass circuit. For example, as shown in the drawings, a first temperature sensor may be in contact with the coolant flowing through module 10 through an aperture 90 located in the first portion 14 of housing 12, immediately downstream of inlet fitting 24. A second temperature sensor may be in contact with the coolant inside module 10 through an aperture located proximate to the coolant outlet port 64, immediately upstream of the coolant outlet fitting 66. The location of temperature sensors upstream and downstream of the coolant bypass circuit, as at points 90 and 92, permits measurement of the temperature difference across the coolant pumping module 10. The temperature data gathered by the temperature sensors may be transmitted to one or more electronic controllers (not shown) controlling operation of valve 26 and/or pump 58. For example, an electronic controller can be operated to control actuation of valve 26 to vary the volume of coolant flow through the bypass circuit, thereby providing a measure of control over the temperature of the coolant exiting the coolant pumping module 10.

Similarly, the coolant pumping module 10 can be provided with means for sensing the pressure of the coolant flowing through the module 10. Preferably, the pressure is sensed by at least two pressure sensors, with one pressure sensor located on the low pressure side of the coolant pumping module 10 and a second pressure sensor located on the high pressure side of the coolant pumping module 10. Apertures 90 and 92 may also provide suitable locations for pressure sensors. In particular, a first pressure sensor may be in contact with the coolant flowing through module 10 through aperture 90, which is located on the low pressure side of module 10, and a second pressure sensor may be in contact with the coolant inside module 10 through aperture 92 which is located on the high pressure side of module 10. The location of pressure sensors at points 90 and 92 permits measurement of the pressure difference across the coolant pumping module 10. The pressure data gathered by the temperature sensors may be transmitted to one or more electronic controllers (not shown) controlling operation of pump 58. For example, an electronic controller can be operated to vary the pump speed for control of the pressure of the coolant exiting the coolant pumping module 10.

Figure 9:
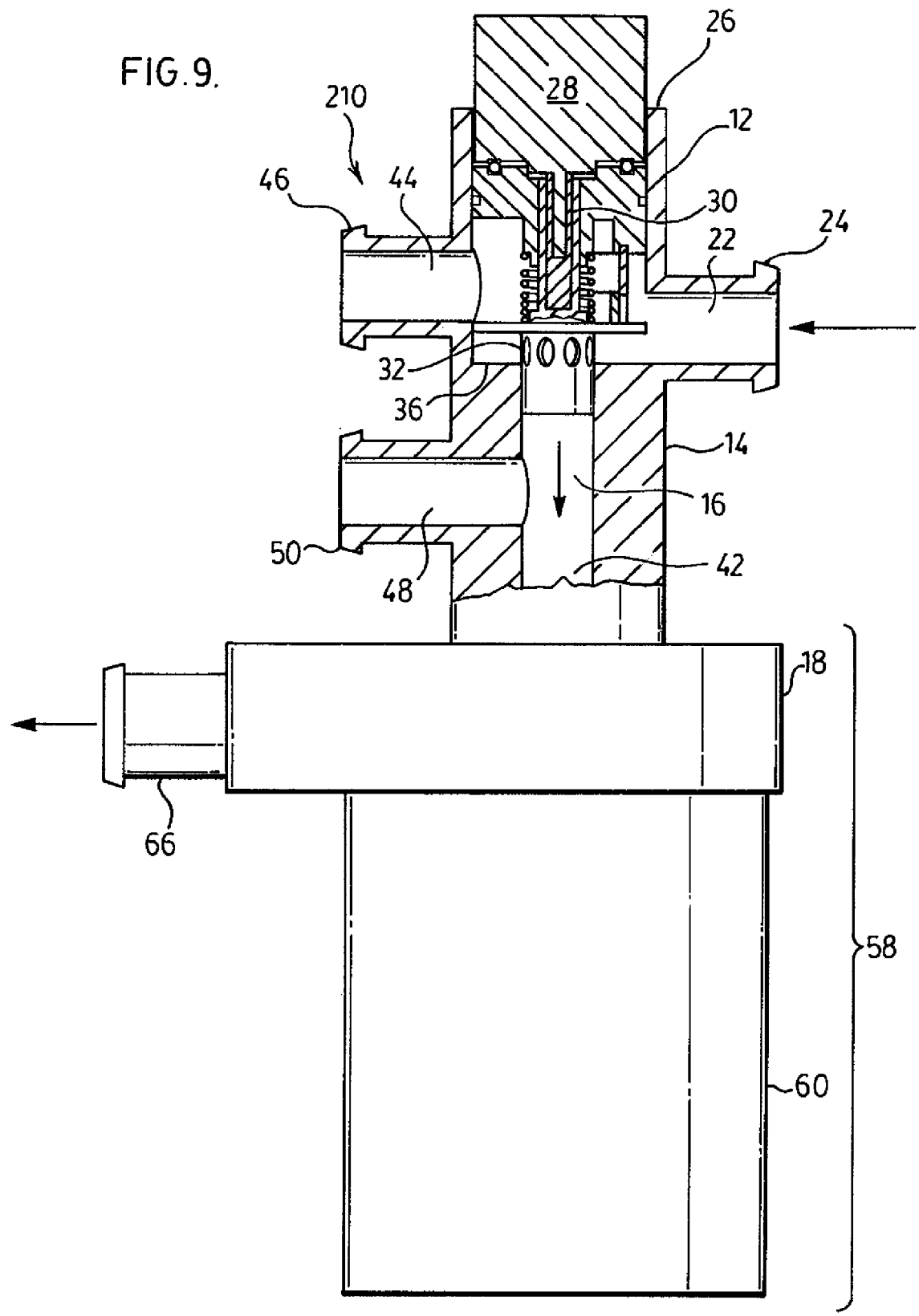
FIG. 9 is a side view, partly in cross-section, showing a coolant pumping module according to a third embodiment of the invention.

FIG. 9 illustrates a coolant pumping module 210 according to a third embodiment of the invention. Coolant pumping module 210 is similar to coolant pumping modules 10 and 110 described above, and similar components of coolant pumping module 210 are identified by similar reference numerals. The coolant pumping module 210 differs from coolant pumping modules 10 and 110 in that the first axis A defined by the valve chamber 16 is parallel to second axis B defined by the connecting passage 42, whereas in coolant pumping modules 10 and 110 the axes A and B are perpendicular to one another.

FIG. 9 illustrates coolant pumping module 210 with the valve 26 in the fully open position. In this configuration, all of the coolant flows from the inlet port 22, through the apertures of valve element 32 and through the connecting passage 42 to pump 58 without passing through the coolant bypass circuit. This is analogous to the configuration of coolant pumping module 10 shown in FIG. 4. The valve 26 of coolant pumping module 210 may be in the fully or partially open configuration during initial start-up, until the fuel cell system reaches the desired operating temperature. As the system warms up, the actuator 28 causes the valve element 32 to move toward engagement with the shoulder 36 to partially or completely block the direct flow of coolant from the inlet port 22 to the connecting passage 42. More of the coolant is then forced to circulate through the bypass circuit, leaving the coolant pumping module 210 through bypass outlet port 44 and returning through bypass inlet port 48.

Although not illustrated in FIG. 9, the coolant pumping module 210 may be provided with means for filtering the coolant as described above with reference to FIGS. 6 to 8. The coolant pumping module 210 may also be provided with at least one secondary inlet port and at least one secondary outlet port as described above with reference to coolant pumping modules 10, 110 for circulating the coolant through other components of the fuel cell system, including heat exchangers, filters and/or heat-generating components. Furthermore, the coolant pumping module 210 may be provided with temperature and/or pressure sensors as described above with reference to coolant pumping modules 10, 110.

Figure 10:
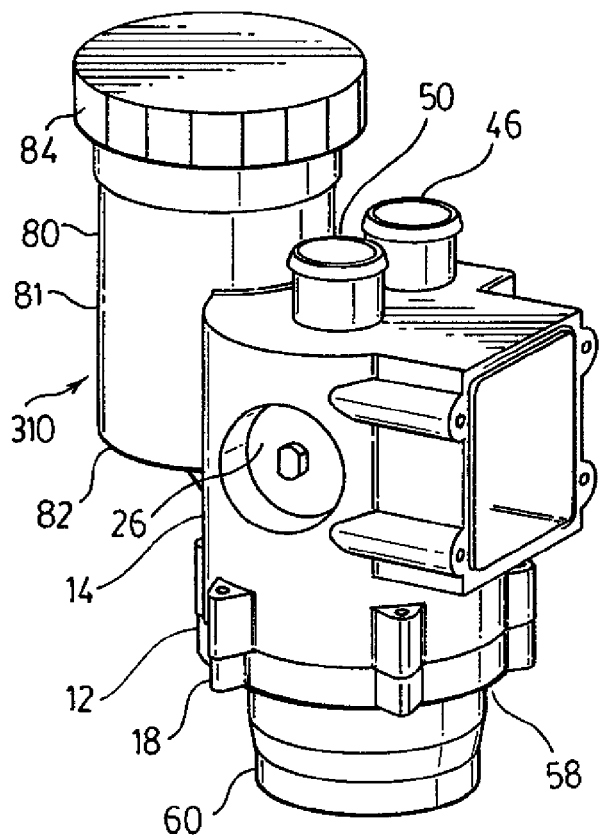
FIGS. 10 and 11 are side perspective views of a coolant pumping module according to a fourth embodiment of the invention.
Figure 11:
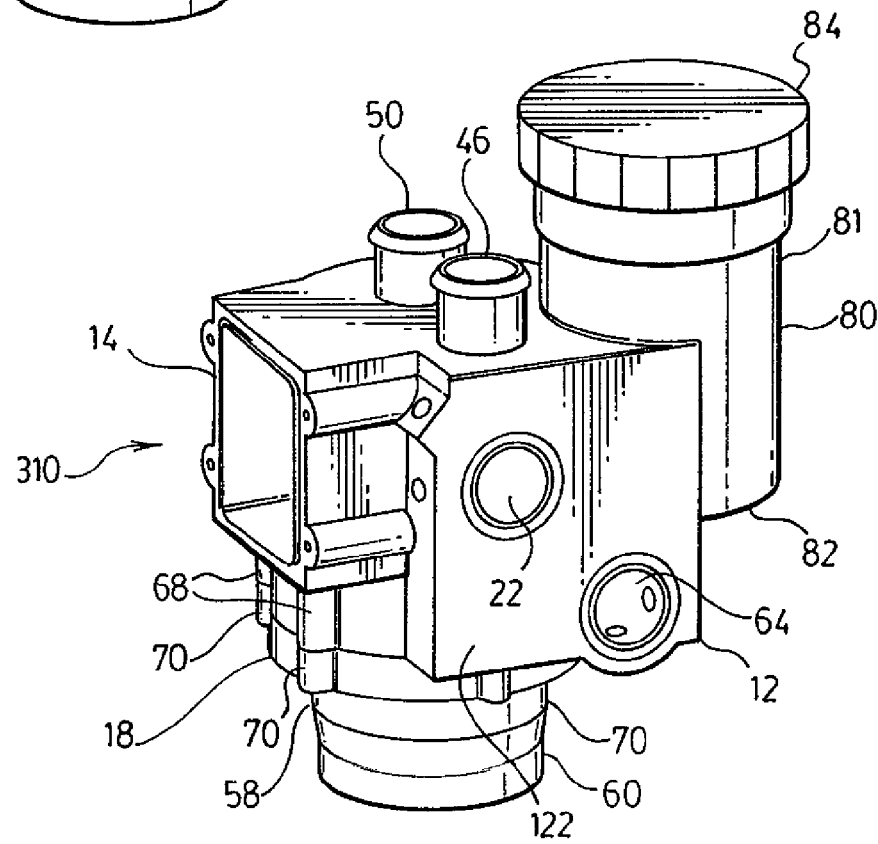

FIGS. 10 and 11 illustrate a coolant pumping module 310 according to a fourth embodiment of the invention. Coolant pumping module 310 is similar to coolant pumping module 110 described above, and similar components of coolant pumping module 310 are identified by similar reference numerals. The coolant pumping module 310 differs from coolant pumping module 110 in that it includes a housing 120 for the pump controller (not shown) which is integrally formed with the housing 12 of the coolant pumping module 310. In the other embodiments described herein, the pump controller is housed within the pump housing 60 along with the pump motor. The relocation of the pump controller to housing 120 maintains fluid cooling of the pump controller while permitting the pump housing 60 to be reduced in size. This feature provides added design freedom to assist in adapting the coolant pumping module to specific space requirements.

The coolant pumping module 310 also differs from the other coolant pumping modules described herein in a number of other respects. For example, coolant pumping module 310 has both the coolant inlet port 22 and the coolant outlet port 64 located in a flat face 122 of the module housing 14, as dictated by space requirements.

Although the invention has been described with reference to certain embodiments, it is not intended to be restricted thereto. Rather, the invention includes within its scope all embodiments which may fall within the scope of the following claims.

What is claimed is:

1. A coolant pumping module for a thermal management system, comprising:
   (a) a housing defining a first chamber and a second chamber which are integrally formed with one another and which are in fluid communication through a connecting passage, wherein the housing has a coolant inlet port provided in communication with the first chamber and a coolant outlet port provided in communication with the second chamber, wherein the housing has a bypass inlet port and a bypass outlet port which are in fluid communication with the first chamber, and wherein a first axis is defined by a direction of flow of the coolant through the first chamber;

(b) a valve element provided in the first chamber, wherein the valve element is movable along said first axis between a first position in which the valve element at least partially blocks flow of coolant between the coolant inlet port and the connecting passage, and a second position in which increased fluid flow is permitted between the coolant inlet port and the connecting passage; and (c) a pump element provided in the second chamber for increasing the energy of coolant flowing through said coolant outlet port, wherein the bypass inlet port and the bypass outlet port are axially spaced from one another along said first axis, and wherein the bypass outlet port is located along said axis between the inlet port and the connecting passage.

2. The coolant pumping module of claim 1, wherein the connecting passage is enclosed within the housing.

3. The coolant pumping module of claim 1, wherein the valve element completely blocks direct fluid flow between the coolant inlet port and the connecting passage with the valve element in said first position.

4. The coolant pumping module of claim 1, wherein the connecting passage defines a second axis.

5. The coolant pumping module of claim 4, wherein the second axis is perpendicular to said first axis.

6. The coolant pumping module of claim 4, wherein the second axis is parallel to said first axis.

7. The coolant pumping module of claim 1, wherein said pump element comprises a pump volute.

8. The coolant pumping module of claim 1, wherein the second chamber includes means for connecting the second chamber to a pump housing.

9. The coolant pumping module of claim 1, further comprising a filter for filtering the coolant, wherein the filter includes a housing which is integrally formed with the housing defining said first and second chambers.

10. The coolant pumping module of claim 9, wherein the filter housing has a filter inlet passage which extends between a high pressure side of the coolant pumping module, downstream of the pumping element, and a filter inlet located in an interior of the filter housing; and wherein the filter housing has a filter outlet passage which extends between a low pressure side of the coolant pumping module, upstream of the pumping element, and a filter outlet located in the interior of the filter housing.

11. The coolant pumping module of claim 10, wherein the diameters of the filter inlet passage and filter outlet passage are sized so as to control the amount of coolant which is circulated through the filter.

12. The coolant pumping module of claim 11, wherein an amount of coolant circulating through the filter is controlled by providing the coolant pumping module with a control valve to control the amount of coolant flowing through the filter inlet passage or the filter outlet passage.

13. The coolant pumping module of claim 1, further comprising a secondary inlet port and a secondary outlet port through which a portion of the coolant flowing through the coolant pumping module is diverted to another component of the thermal management system;

wherein said portion of the coolant is diverted to said other component through the secondary outlet port, and said secondary outlet port is located on a high pressure side of the coolant pumping module; and wherein the secondary inlet port receives said portion of the coolant from said other component, and said secondary inlet port is located on a low pressure side of the coolant pumping module.

14. The coolant pumping module of claim 13, wherein said other component of the thermal management system is selected from the group consisting of a heat exchanger, a filter and a heat-generating component.

15. The coolant pumping module of claim 1, wherein said housing of the coolant pumping module further includes a housing for a pump controller, wherein the housing for the pump controller is integrally formed with the housing of the coolant pumping module.

16. The coolant pumping module of claim 10, wherein the filter housing is cylindrical and the filter further comprises an annular filter element, and wherein the filter outlet of the filter housing is spaced from the filter inlet so that the coolant passes through the filter element as it flows from the filter inlet to the filter outlet.

* * * * *